United States Patent
Kirkpatrick

(10) Patent No.: US 7,294,195 B2
(45) Date of Patent: Nov. 13, 2007

(54) WATER REPELLANT GYPSUM COMPOSITIONS

(75) Inventor: Richard L. Kirkpatrick, Adrian, MI (US)

(73) Assignee: Wacker Chemical Corporation, Adrian, MI (US)

( * ) Notice: Subject to any disclaimer, the term of this patent is extended or adjusted under 35 U.S.C. 154(b) by 299 days.

(21) Appl. No.: 11/199,013

(22) Filed: Aug. 8, 2005

(65) Prior Publication Data

US 2007/0028809 A1   Feb. 8, 2007

(51) Int. Cl.
- C04B 28/14  (2006.01)
- C04B 41/50  (2006.01)
- C04B 40/00  (2006.01)
- B29C 65/00  (2006.01)
- B32B 9/04   (2006.01)

(52) U.S. Cl. .......... 106/780; 106/781; 106/287.1; 106/165.01; 106/819; 106/823; 156/39; 428/703

(58) Field of Classification Search ........ 106/780, 106/781, 287.1, 165.01, 819, 823; 156/39; 428/703

See application file for complete search history.

(56) References Cited

U.S. PATENT DOCUMENTS

| | | |
|---|---|---|
| 1,496,198 A | 6/1924 | Aurynger |
| 3,895,956 A | 7/1975 | Yoshida et al. |
| 4,629,743 A | 12/1986 | Hong |
| 5,464,631 A | 11/1995 | Hoover et al. |
| 5,879,446 A | 3/1999 | Patel et al. |
| 5,993,526 A | 11/1999 | Sommer et al. |
| 6,171,388 B1 | 1/2001 | Jobbins |
| 6,441,034 B1 | 8/2002 | Roy |
| 6,569,541 B1 | 5/2003 | Martin et al. |
| 6,676,970 B2 | 1/2004 | Bader et al. |
| 6,699,339 B2 | 3/2004 | Adler et al. |
| 2004/0126607 A1 | 7/2004 | Suzuki |
| 2004/0259981 A1 | 12/2004 | Krog |

FOREIGN PATENT DOCUMENTS

GB    2 041 384 A    9/1980

*Primary Examiner*—Elizabeth D. Wood
(74) *Attorney, Agent, or Firm*—Brooks Kushman P.C.

(57) ABSTRACT

In at least one embodiment, the present invention relates to a gypsum composition suitable for use in the manufacture of construction materials comprising a) gypsum, b) water, and c) a water repellancy composition comprising a hydroxy-based cellulose and a siliconate.

21 Claims, No Drawings

WATER REPELLANT GYPSUM COMPOSITIONS

BACKGROUND OF THE INVENTION

1. Field of the Invention

The present invention relates to gypsum compositions for making gypsum containing materials, such as, "wallboard" and "drywall."

2. Background Art

Gypsum wallboard, sometimes referred to as "drywall" or "plaster board" is one of the most common materials used in the construction of walls and other barriers. A common method of producing wallboard is to sandwich a core containing an aqueous slurry of gypsum between two sheets of board cover paper. Gypsum is also commonly known as stucco and calcium sulfate hemihydrate. The term "gypsum", unless specifically stated otherwise, will be understood to include calcium sulfate hemihydrate, calcined gypsum, stucco and gypsum. In one wallboard manufacturing process, the aqueous slurry of gypsum and other wallboard ingredients are continuously deposited under high speed conditions to form a core between two continuously supplied moving sheets of cover paper. Various types of suitable cover paper are known in the art.

After the gypsum slurry is deposited between the two cover sheets, it is then allowed to set (react with water to form calcium sulfate dihydrate) to form the wallboard core. The continuously-produced board may then be cut into panels of a desired length (for example, eight feet). The boards may then be passed through a dryer to remove any excess water in the core and the gypsum is brought to a final dry state. After the core has set and is dried, the sandwich becomes a strong, rigid, fire-resistant gypsum wallboard. Other methods for the production of gypsum wallboard are described, for example, in the Kirk-Othmer Encyclopedia of Chemical Technology, Vol. 21, pages 621-24 (Second Edition 1970) and Vol. 4, pages 618-19 (Fourth Edition 1992), and U.S. Pat. No. 5,879,446 the disclosures of which are hereby incorporated herein by reference.

In order to facilitate the production of wallboard and/or provide beneficial properties to the final product, various additives may also be included in the core gypsum slurry. For example, starch, set accelerators and/or set retarders, preservatives, and fiberglass may be included. Since wallboard is used in construction, it is desirable to prevent prolonged exposures of the wallboard to water and moisture. Certain "water repellancy," additives/agents, such as wax, have been used in order to improve the water repellancy of the wallboard. Wax, however, can be relatively unreliable and somewhat costly.

Accordingly, it would be advantageous to provide wallboard having water repellancy without producing the deleterious effects found in the prior art.

SUMMARY OF THE INVENTION

It has now been discovered that the water repellancy of wallboard can be increased by incorporating into the gypsum composition a water repellancy composition comprising a hydroxy-based cellulose and a siliconate.

Accordingly, in at least one embodiment, the present invention comprises a gypsum, water, and water repellancy composition comprising a hydroxy-based cellulose and siliconate.

Moreover, in at least another embodiment, the present invention comprises a method of making a gypsum composition suitable for use in the manufacture of construction materials comprising mixing together, in any combination: a) gypsum, b) water, and c) a water repellancy composition comprising a hydroxy-based cellulose and a siliconate.

Furthermore, in at least another embodiment, the present invention comprises a wallboard including two sheets of board paper and a gypsum core between the sheets of board paper. In at least certain embodiment, the gypsum core is made from the gypsum composition described above.

DETAILED DESCRIPTION OF THE PREFERRED EMBODIMENT(S)

As required, detailed embodiments of the present invention are disclosed herein. However, it is to be understood that disclosed embodiments are merely exemplary of the invention that may be embodied in various alternative forms.

Except in the operating examples, or where otherwise expressly indicated, all numerical quantities in this description indicating amounts of material or conditions of reaction and/or use are to be understood as modified by the word "about" in describing the broadest scope of the invention. Practice within the numerical limits stated is generally preferred. Also, unless expressly stated to the contrary: percent, "parts of", and ratio values are by weight; the term "polymer" includes "oligomer", "copolymer", "terpolymer", and the like; the description of a group or class of materials as suitable or preferred for a given purpose in connection with the invention implies that mixtures of any two or more of the members of the group or class are equally suitable or preferred; description of constituents in chemical terms refers to the constituents at the time of addition to any combination specified in the description, and does not necessarily preclude chemical interactions among the constituents of a mixture once mixed; specification of materials in ionic form implies the presence of sufficient counter-ions to produce electrical neutrality for the composition as a whole (any counter-ions thus implicitly specified should preferably be selected from among other constituents explicitly specified in ionic form, to the extent possible; otherwise such counter-ions may be freely selected, except for avoiding counter-ions that act adversely to the objects of the invention); the first definition of an acronym or other abbreviation applies to all subsequent uses herein of the same abbreviation and applies mutatis mutandis to normal grammatical variations of the initially defined abbreviation; and the term "mole" and its variations may be applied to elemental, ionic, and any other chemical species defined by number and type of atoms present, as well as to compounds with well defined molecules.

Gypsum compositions made in accordance with the present invention comprise, at a minimum gypsum, water, and a water repellancy composition comprising a hydroxy-based cellulose and a siliconate. The gypsum compositions of the present invention can be utilized to make various construction materials such as drywall.

In at least certain embodiments, the gypsum is preferably present in the gypsum compositions of the present invention in an amount of about 35 to about 75 weight percent, based on the weight of the gypsum composition, more preferably about 40 to about 65 weight percent, and most preferably about 45 to about 60 weight percent. Preferably, the beta-hemihydrate form of gypsum is used with the invention.

The gypsum can be produced by a dry calcination method, such as kettle, calcidyne, holoflyte, rotary kiln, impmill, or caludis peter calcination. Dry gypsum typically has a higher surface area than that produced by autoclave calcination (steam calcination). Gypsums produced by dry calcination methods typically have high surface energy, so they are generally more reactive than those produced by autoclave calcination. Because of high surface area, these gypsums require four to five times more water to produce a fluid slurry.

Calcium sulfate (gypsum) is described in the Kirk-Othmer Encyclopedia of Chemical Technology, Vol. 4, pages 812-26 (Fourth Edition 1992), and U.S. Pat. Nos. 6,171,388 and 5,879,446, the disclosures of which are hereby incorporated herein by reference.

In at least certain embodiment, the water is preferably present in the gypsum composition of the present invention in amount of about 25 to about 60 weight percent, based on the total weight of the gypsum composition, more preferably in an amount of about 32 to about 50 weight percent, and most preferably in an amount of about 35 to about 45 weight percent.

In at least one embodiment, the water repellancy composition comprises a hydroxy-based cellulose and a siliconate. The gypsum composition of the present invention preferably comprises the water repellant composition in an amount effective to increase the water repellancy of a construction material relative to the water repellancy of a similar construction material not containing the effective amount of water repellancy composition.

In at least one embodiment, the hydroxy-based cellulose is preferably present in the gypsum composition in an amount of 0.050 to 3.0 weight percent, based on the total weight of the gypsum composition, more preferably in an amount of 0.1 to 1.50 weight percent, and most preferably in an amount of 0.25 to 0.70 weight percent. Any suitable hydroxy-based cellulose may be used. Suitable examples of hydroxy-based celluloses include, but are not necessarily limited to, hydroxyethyl cellulose, hydroxypropyl cellulose, hydroxyethyl methyl cellulose, hydroxypropyl methyl cellulose, carboxymethyl cellulose, methyl hydroxy cellulose, hydroxymethyl cellulose, and methylhydroxyethyl cellulose.

In at least one embodiment, suitable hydroxy-based celluloses have a molecular weight of from 50,000 to 500,000, and preferably from 75,000 to 150,000, with a chain length of from 300 to 1500 repeating units, and more preferably from 400 to 700. The hydroxy-based cellulose should also have a viscosity range of from 1000 to 100,000 cps, and more preferably from 2000 to 10,000 cps, as measured by 2% solution in water at 20° C. according to ASTM D 2363. Hydroxy-based cellulose such as these are normally identified by their viscosity rather than molecular weight.

In at least one embodiment, the siliconate (based on solids) is present in the gypsum composition in an amount of 0.0005 to 0.5 weight percent, based on the total weight of the gypsum composition, more preferably in an amount of 0.005 to 0.20 weight percent, and most preferably in an amount of 0.1 to 0.125 weight percent.

Any suitable siliconate may be used. Suitable examples of siliconates include, but are not necessarily limited to, $NaOSi(OH)_2(CH_2)_3NH_2$, $NaO(OH)Si(CH_3)(CH_2)_3NH_2$, $KO_{0.5}(HO)_{1.5}Si(CH_3)(CH_2)_3NH_2$, $KOSi(OH)_2(CH_2)_3NH_2$, $LiO(OH)Si(CH_3)(CH_2)_3NH_2$, and $KO(HO)Si(CH_3)(CH_2)_3NH_2$.

In at least one embodiment, the siliconate solid is provided in a 30-90%, by weight, solution of water. In other words, the siliconate solid is present in the solution in an amount of 10-70% by weight. In these embodiments, the siliconate solution may be present in the gypsum composition in an amount of 0.025 to 10 weight percent, based on the total weight of the gypsum composition, more preferably in an amount of 0.05 to 6 weight percent, and most preferably in an amount of 0.2 to 1 weight percent.

In at least one embodiment, the water repellancy composition may be prepared by mixing the components in the water (in any order) at or about room temperature using conventional mixing equipment. A preferred procedure for preparing a water repellancy composition useful with the present invention is diluting the desired level of the cellulose and siliconate in water. While the cellulose and siliconate are typically provided as separate components, it is contemplated that they may be provided as a single pack component. In at least one embodiment, the cellulose and siliconate solids are present in a weight ratio, based on solids, of 10:1 to 1:2, and in other embodiments of 1:1 to 2:1.

Other dry ingredients may be included in the gypsum composition, including an accelerator which can be used to control, within certain limits, the crystal growth rate and set time of the gypsum. Examples of suitable accelerators include ball mill accelerators ("BMA"), $CaCl_2$, $Na_2CO_3$, and $K_2SO_4$, although others are known to those of skill in the art. Usually, both potassium sulfate and ball mill accelerators are used.

An aqueous slurry or solution of paper pulp may also be included in the gypsum composition. A pulp solution typically comprises water and paper fibers ("paper pulp"), and may also include corn starch and/or potash.

A retarder optionally may be included in the paper pulp solution and is used in conjunction with the aforementioned accelerator in order to tailor the set time of the gypsum composition. Typically, retarders that may be used include sodium citrate, sodium phosphate and the like.

The gypsum compositions of the present invention may be made by using conventional mixing equipment at room temperature to mix the components (in any order). Generally, the gypsum compositions may be prepared by swiftly mixing the gypsum with an aqueous solution containing the water repellancy composition to form an aqueous slurry.

The wallboard can be made according to any known method as long as the water repellancy composition is added to the gypsum composition. One process for manufacturing the core composition and wallboard of the invention initially includes the premixing of dry ingredients in a mixing apparatus. The dry ingredients preferably include gypsum, an optional accelerator, and an antidesiccant (e.g., starch). In at least one embodiment, the dry ingredients may preferably be mixed together with a "wet" (aqueous) portion of the core composition in a pin mixer apparatus.

The wet portion can include a first component (referred to as a "paper pulp solution") that includes a mixture of water, paper pulp, and the water repellancy composition of the present invention. A set retarder can be included. The paper pulp solution can provide a major portion of the water that forms the gypsum slurry of the core composition. The water supplied in the wet portion of the composition should include sufficient water for the setting reaction of the gypsum, plus an additional amount to decrease the consistency of the slurry during the manufacturing process. A second wet component may include a mixture of foam and other conventional additives, if desired, foam, starch, surfactants, and glass fiber.

The pulp solution can be prepared by blending or mixing the above ingredients with water in a blending apparatus. Alternatively, a concentrated pulp solution using only a small volume of water can be produced. In this case, the remainder of the core mix water requirement can be made up with a separate water source. Preferably, high shear mixing "pulps" the material, forming a homogenous solution or slurry. The pulp solution can be transferred to a holding vessel, from which it can be continuously added to the core composition mix. The paper fibers in the pulp solution serve to enhance the flexibility of the gypsum wallboard.

The produced core gypsum composition slurry is deposited between paper cover sheets to form a sandwich. The core gypsum composition is allowed to cure or set, whereby calcium sulfate hemihydrate (gypsum) is converted to calcium sulfate dihydrate. The product is then preferably dried by exposing the product to heat, in order to remove excess water not consumed in the reaction forming the calcium sulfate dihydrate.

The setting reaction produces gypsum crystals, which are interwoven to contribute strength to the wallboard core. The crystal-to-crystal interaction is important to the final strength of the gypsum wallboard product. The gypsum crystals also preferably interlock with paper fibers protruding from the surface or cover papers, thus bonding the papers to the core. This bonding or interaction also increases the strength of the wallboard product.

The use of the water repellancy composition of the present invention increases the water repellancy of the wallboard.

The practice of this invention may be further appreciated by consideration of the following, non-limiting examples, and the benefits of the invention may be appreciated by the examples set forth below. Those skilled in the art will recognize many variations that are within the spirit of the present invention and scope of the claims.

EXAMPLE 1

The water repellancy of various gypsum compositions containing water repellancy compositions are tested in the following manner.

Gypsum compositions having various water repellancy compositions are prepared and formed into wallboard core samples. The water repellancy of the gypsum compositions are measured utilizing a two hour water uptake test patterned after ASTM C473. As will be discussed further below, the test utilized herein is essentially the same as that set forth in ASTM C473 except for the difference in the sample size. The test is used to determine the amount of water that is taken up by a wallboard core sample. The lower the water uptake, or percent uptake, the more water repellant a water repellancy composition can be considered to be and thus the more water repellant a wallboard or other building product will be employing the composition.

Gypsum compositions are prepared using a Dispermat® having a cowles blade (about 2.5 inches) operating at a speed of about 1,000 rpm. The gypsum compositions are prepared by adding the cellulose into a plastic beaker containing the water. The solution is mixed for about one minute. The siliconate is then added to the beaker and mixed for another 45 seconds. The gypsum is then slowly poured into the solution (over a 15 second time period) to minimize dusting. The gypsum composition is then mixed for 45 seconds. Then, the gypsum composition is poured out of the beaker into disc molds having dimensions of a 10 cm inside diameter by a 2 cm thickness. The gypsum compositions are then allowed to sit in the molds at room temperature for 1-2 hours. The discs are then removed from the molds and then put in an oven at about 40° C. for about 48 hours. The discs are then removed and allowed to cool to room temperature (about 70° F.) and then weighed to obtain the dry weight of the sample. The discs are then immersed in water with 1 inch of head space for two hours. The discs are then removed from the water and weighed to determine the amount of water uptake.

Any suitable gypsum (Beta-type $CaSO_4 \cdot \frac{1}{2}H_2O$) can be used for these measurements, such as those from National Gypsum Corporation Research Center in Buffalo, N.Y., Georgia Pacific, and USG Gypsum.

These tests are conducted at differing compositions and weight percents of water repellancy composition candidates. The compositions and results are shown in Table 1. The weight percents are expressed as weight percent solids with any water that the solids are carried in being accounted for in the water weight percent.

TABLE 1

| Sample No. | Cellulose wt. % | Siliconate wt. % | Gypsum wt. % | Water wt. % | Dry Weight of Sample | 2 Hour Water Update Weight | % Uptake |
|---|---|---|---|---|---|---|---|
| | Walocel® MW 6000 PFV | BS 16 | | | | | |
| 1 | 0.28% | 0.000% | 55.4% | 44.32% | 101.285 | 128.16 | 26.532 |
| 2 | 0.55% | 0.59% | 54.64% | 44.22% | 87.70 | 88.79 | 1.2427 |
| 3 | 0.55% | 0.44% | 54.79% | 44.21% | 86.48 | 87.635 | 1.3356 |
| 4 | 0.55% | 0.15% | 55.10% | 44.20% | 87.03 | 89.075 | 2.3497 |
| 5 | 0.27% | 0.59% | 54.79% | 44.34% | 84.995 | 86.14 | 1.3472 |
| 6 | 0.27% | 0.45% | 54.95% | 44.34% | 85.93 | 87.085 | 1.3436 |
| 7 | 0.28% | 0.15% | 55.25% | 44.33% | 87.32 | 88.85 | 1.752 |
| | Walocel® XM 3000 PV | BS 16 | | | | | |
| 8 | 0.28% | 0.000% | 55.4% | 44.32% | 104.68 | 135.38 | 29.327 |
| 9 | 0.55% | 0.59% | 54.64% | 44.22% | 91.05 | 92.57 | 1.6694 |
| 10 | 0.55% | 0.44% | 54.79% | 44.21% | 91.03 | 92.49 | 1.6041 |
| 11 | 0.55% | 0.15% | 55.10% | 44.20% | 90.18 | 92.515 | 2.5894 |
| 12 | 0.27% | 0.59% | 54.79% | 44.34% | 93.46 | 94.87 | 1.509 |
| 13 | 0.27% | 0.45% | 54.95% | 44.34% | 92.735 | 94.05 | 1.418 |
| 14 | 0.28% | 0.15% | 55.25% | 44.33% | 90.765 | 91.99 | 1.3498 |

TABLE 1-continued

| Sample No. | Cellulose wt. % | Siliconate wt. % | Gypsum wt. % | Water wt. % | Dry Weight of Sample | 2 Hour Water Update Weight | % Uptake |
|---|---|---|---|---|---|---|---|
| | Walocel ® MKX 6000 PF01 | BS 16 | | | | | |
| 15 | 0.28% | 0.000% | 55.4% | 44.32% | 88.07 | 126.055 | 43.132 |
| 16 | 0.55% | 0.59% | 54.64% | 44.22% | 86.805 | 87.935 | 1.3017 |
| 17 | 0.55% | 0.44% | 54.79% | 44.21% | 87.335 | 88.46 | 1.2882 |
| 18 | 0.55% | 0.15% | 55.10% | 44.20% | 86.57 | 88.82 | 2.6069 |
| 19 | 0.27% | 0.59% | 54.79% | 44.34% | 92.94 | 74.3 | 1.8645 |
| 20 | 0.27% | 0.45% | 54.95% | 44.34% | 82.075 | 83.405 | 1.6208 |
| 21 | 0.28% | 0.15% | 55.25% | 44.33% | 84.375 | 85.86 | 1.7623 |
| | Walocel ® MK 3000 PF01 | BS 16 | | | | | |
| 22 | 0.28% | 0.000% | 55.4% | 44.32% | 83.335 | 119.645 | 43.577 |
| 23 | 0.55% | 0.59% | 54.64% | 44.22% | 91.585 | 92.895 | 1.4304 |
| 24 | 0.55% | 0.44% | 54.79% | 44.21% | 88.405 | 89.77 | 1.544 |
| 25 | 0.55% | 0.15% | 55.10% | 44.20% | 88.695 | 91.015 | 2.6158 |
| 26 | 0.27% | 0.59% | 54.79% | 44.34% | 77.55 | 78.98 | 1.844 |
| 27 | 0.27% | 0.45% | 54.95% | 44.34% | 79.6 | 81.045 | 1.8154 |
| 28 | 0.28% | 0.15% | 55.25% | 44.33% | 80.87 | 82.24 | 1.6941 |
| | Walocel ® MT 400 PFV | BS 16 | | | | | |
| 29 | 0.28% | 0.000% | 55.4% | 44.32% | 101.76 | 145.11 | 42.6 |
| 30 | 0.55% | 0.59% | 54.64% | 44.22% | 90.63 | 92.805 | 2.3996 |
| 31 | 0.55% | 0.44% | 54.79% | 44.21% | 90.72 | 92.87 | 2.3698 |
| 32 | 0.55% | 0.15% | 55.10% | 44.20% | 91.76 | 93.825 | 2.2507 |
| 33 | 0.27% | 0.59% | 54.79% | 44.34% | 76.28 | 77.84 | 2.0451 |
| 34 | 0.27% | 0.45% | 54.95% | 44.34% | 79.03 | 80.66 | 2.0625 |
| 35 | 0.28% | 0.15% | 55.25% | 44.33% | 79.40 | 80.915 | 1.908 |
| | Walocel ® MW 6000 PFV | DC 772 | | | | | |
| 36 | 0.55% | 0.09% | 55.08% | 44.28% | 88.31 | 91.12 | 3.1821 |
| 37 | 0.31% | 0.09% | 55.21% | 44.39% | 85.67 | 87.385 | 2.0016 |
| | Walocel ® XM 3000 PV | DC 772 | | | | | |
| 38 | 0.55% | 0.09% | 55.08% | 44.28% | 91.125 | 93.705 | 2.8309 |
| 39 | 0.31% | 0.09% | 55.21% | 44.39% | 96.545 | 98.255 | 1.7713 |
| | Walocel ® MKX 6000 PF01 | DC 722 | | | | | |
| 40 | 0.55% | 0.09% | 55.08% | 44.28% | 89.23 | 91.85 | 2.937 |
| 41 | 0.31% | 0.09% | 55.21% | 44.39% | 86.675 | 88.35 | 1.9325 |
| | Walocel ® MK 3000 PF | DC 772 | | | | | |
| 42 | 0.55% | 0.09% | 55.08% | 44.28% | 88.92 | 92.13 | 3.6101 |
| 43 | 0.31% | 0.09% | 55.21% | 44.39% | 81.955 | 84.79 | 3.4579 |
| 44 | 0.000% | 0.37% | 54.86% | 44.76% | 100.945 | 108.015 | 7.0117 |
| 45 | 0.000% | 0.28% | 55.04% | 44.68% | 100.62 | 119.455 | 18.718 |
| 46 | 0.000% | 0.09% | 55.38% | 44.52% | 104.835 | 150.375 | 43.44 |
| | Walocel ® MT 400 PFV | DC 772 | | | | | |
| 47 | 0.55% | 0.09% | 55.08% | 44.28% | 91.085 | 94.17 | 3.404 |
| 48 | 0.31% | 0.09% | 55.21% | 44.39% | 77.55 | 80.795 | 4.1856 |
| | | BS16 | | | | | |
| 49 | 0% | 0% | 55.6% | 44.4% | 104.43 | 147.43 | 41.158 |
| 50 | 0% | 0.1% | 55% | 44.5% | 96.97 | 124.49 | 28.383 |
| 51 | 0% | 0.60% | 54.9% | 44.5% | 85.415 | 86.89 | 1.7277 |

TABLE 1-continued

| Sample No. | Cellulose wt. % | Siliconate wt. % | Gypsum wt. % | Water wt. % | Dry Weight of Sample | 2 Hour Water Update Weight | % Uptake |
|---|---|---|---|---|---|---|---|
| 52 | 0% | 0.45% | 55.15% | 44.4% | 92.925 | 97.59 | 5.0207 |
| 53 | 0% Walocel ® MT 400 PFV | 0.15% BS 16 | 55.95% | 43.9% | 99.575 | 134.865 | 35.44 |
| 54 | 0.2% | 0.1% | 55% | 44.5% | 82.38 | 84.02 | 1.9898 |
| 55 | 1.0% Walocel ® MT 400 PFV | 0.1% BS Drysoil | 54% | 44% | 91.615 | 93.47 | 2.025 |
| 56 | 0.27% | 0.30% | 54.79% | 44.64% | 94.26 | 96.185 | 2.0419 |
| 57 | 0.55% | 0.30% | 54.64% | 44.51% | 95.85 | 99.5 | 3.808 |
| 58 | 0.28% | 0.15% | 55.10% | 44.48% | 94.265 | 96.255 | 2.111 |
| 59 | 0.55% | 0.15% | 54.95% | 44.36% | 97.7 | 101.055 | 3.434 |

Walocel® MW 6000 PFV is a methyl hydroxy ethyl cellulose able from Wolff Cellulosics of Bayer.

Walocel® XM 3000 PV is a water-soluble modified methyl hydroxy ethyl cellulose available from Wolff Cellulosics of Bayer.

Walocel® MKX 6000 PF is a methyl hydroxy ethyl cellulose available from Wolff Cellulosics of Bayer.

Walocel® MK 3000 PF is a methyl hydroxy propyl cellulose available from Wolff Cellulosics of Bayer.

Walocel® MT 400 PFV is a methyl hydroxy ethyl cellulose available from Wolff Cellulosics of Bayer.

BS 16 (Silres® BS 16) is a potassium methyl siliconate available from Wacker Chemical Corporation of Adrian, Mich.

BS drysoil is a mixture of sodium siliconate and potassium siliconate available from Wacker Chemical Corporation of Adrian, Mich.

DC 772 is a sodium siliconate available from Dow Corning.

The results of Table 1 show the unexpected benefit of water repellancy achieved by water repellancy and gypsum compositions embodied by the present invention.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A gypsum composition suitable for use in the manufacture of construction materials, said gypsum composition comprising:
   a) gypsum;
   b) water; and
   c) a water repellancy composition comprising a hydroxy-based cellulose and a siliconate.

2. The gypsum composition of claim 1 wherein the water repellancy composition is present in an amount effective to increase the water repellancy of the construction material relative to the water repellancy of a similar construction material not containing the effective amount of the water repellancy composition.

3. The gypsum composition of claim 1 wherein the water repellancy is present in the gypsum composition in an amount effective to result in the siliconate being present (based on solids) in the gypsum composition in an amount of 0.05 to 6.0 weight percent, based on the total weight of the gypsum composition.

4. The gypsum composition of claim 1 wherein the water repellancy is present in the gypsum composition in an amount effective to result in the hydroxy-based cellulose being present in the gypsum composition in an amount of 0.005 to 2.5 weight percent, based on the total weight of the gypsum composition.

5. The gypsum composition of claim 3 wherein the water repellancy is present in the gypsum composition in an amount effective to result in the hydroxy-based cellulose being present in the gypsum composition in an amount of 0.005 to 2.5 weight percent, based on the total weight of the gypsum composition.

6. The gypsum composition of claim 3 wherein the siliconate comprises potassium methyl siliconate.

7. The gypsum composition of claim 4 wherein the cellulose comprises methyl hydroxyethyl cellulose.

8. A method of making a gypsum composition suitable for use in the manufacture of construction materials, said method comprising mixing together, in any combination:
   a) gypsum;
   b) water; and
   c) a water repellancy composition comprising a hydroxy-based cellulose and a siliconate.

9. The method of claim 8 wherein the water repellancy composition is present in an amount effective to increase the water repellancy of the construction material relative to the water repellancy of a similar construction material not containing the effective amount of the water repellancy composition.

10. The method of claim 8 wherein the water repellancy is present in the gypsum composition in an amount effective to result in the siliconate being present in the gypsum composition in an amount of 0.05 to 6.0 weight percent solids, based on the total weight of the gypsum composition.

11. The method of claim 8 wherein the water repellancy is present in the gypsum composition in an amount effective to result in the hydroxy-based cellulose being present in the gypsum composition in an amount of 0.005 to 2.5 weight percent, based on the total weight of the gypsum composition.

12. The method of claim 10 wherein the water repellancy is present in the gypsum composition in an amount effective to result in the hydroxy-based cellulose being present in the gypsum composition in an amount of 0.005 to 2.5 weight percent, based on the total weight of the gypsum composition.

13. The method of claim 10 wherein the siliconate comprises potassium methyl siliconate.

14. The method of claim 11 wherein the cellulose comprises methyl hydroxyethyl cellulose.

15. A wallboard comprising:
two sheets of board paper; and
a gypsum core between the sheets of board paper, the gypsum core being the set product of the gypsum composition of claim 1.

16. The wallboard of claim 15, wherein the water repellancy composition is present in an amount effective to increase the water repellancy of the wallboard relative to the water repellancy of a similar wallboard not containing the effective amount of the water repellancy composition.

17. The wallboard of claim 15, wherein the water repellancy is present in the gypsum composition in an amount effective to result in the siliconate being present, based on solids, in the gypsum composition in an amount of 0.05 to 6.0 weight percent, based on the total weight of the gypsum composition.

18. The wallboard of claim 15, wherein the water repellancy is present in the gypsum composition in an amount effective to result in the hydroxy-based cellulose being present in the gypsum composition in an amount of 0.005 to 2.5 weight percent, based on the total weight of the gypsum composition.

19. The wallboard of claim 17, wherein the water repellancy is present in the gypsum composition in an amount effective to result in the hydroxy-based cellulose being present in the gypsum composition in an amount of 0.005 to 2.5 weight percent, based on the total weight of the gypsum composition.

20. A wallboard comprising;
two sheets of board paper; and
a gypsum core between the sheets of board paper, the gypsum core being the set product of the gypsum composition made in accordance with the method of claim 8.

21. A water repellancy composition for increasing the water repellancy of building products, said composition comprising:
a hydroxy-based cellulose; and
a siliconate, with the cellulose and the siliconate being present, based on solids, in a weight ratio of 10:1 to 1:2.

* * * * *